(12) United States Patent
Itoigawa

(10) Patent No.: US 9,018,862 B2
(45) Date of Patent: Apr. 28, 2015

(54) ALTERNATING CURRENT ROTATING MACHINE CONTROL DEVICE

(75) Inventor: Nobuo Itoigawa, Suzuka (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 219 days.

(21) Appl. No.: 13/703,554

(22) PCT Filed: Jan. 27, 2012

(86) PCT No.: PCT/JP2012/051763
§ 371 (c)(1),
(2), (4) Date: Jan. 4, 2013

(87) PCT Pub. No.: WO2012/111406
PCT Pub. Date: Aug. 23, 2012

(65) Prior Publication Data
US 2013/0094599 A1    Apr. 18, 2013

(30) Foreign Application Priority Data

Feb. 16, 2011   (JP) .................................. 2011-031185

(51) Int. Cl.
*G06F 15/16*   (2006.01)
*H04B 3/52*    (2006.01)
*H02P 5/74*    (2006.01)

(52) U.S. Cl.
CPC ... *H04B 3/52* (2013.01); *H02P 5/74* (2013.01)

(58) Field of Classification Search
CPC ............. H02P 6/182; H02P 8/38; H02P 8/40; H02P 5/74; B66B 1/18; G06F 13/4027; G06F 15/76; G06F 9/06; H04W 84/20

USPC ......... 318/34, 41, 68, 42, 71, 44, 818, 49, 50, 318/39, 53; 709/208, 209; 700/3
See application file for complete search history.

(56) References Cited

U.S. PATENT DOCUMENTS

| | | | | |
|---|---|---|---|---|
| 4,114,730 A * | 9/1978 | Means et al. | ................... | 187/247 |
| 4,750,111 A * | 6/1988 | Crosby et al. | ................... | 710/58 |
| 5,239,247 A * | 8/1993 | Habig et al. | ............. | 318/568.18 |
| 5,355,062 A * | 10/1994 | Takizawa et al. | ........... | 318/568.1 |
| 5,493,642 A * | 2/1996 | Dunsmuir et al. | ............ | 715/839 |
| 6,586,898 B2 * | 7/2003 | King et al. | ............... | 318/400.34 |
| 7,026,784 B2 * | 4/2006 | Shimizu et al. | .......... | 318/400.26 |
| 7,119,514 B2 * | 10/2006 | Shimizu et al. | .......... | 318/400.13 |
| 7,719,214 B2 * | 5/2010 | Leehey et al. | ................... | 318/34 |

FOREIGN PATENT DOCUMENTS

| | | |
|---|---|---|
| JP | 10-304696 A | 11/1998 |
| JP | 2008-178236 A | 7/2008 |
| JP | 2009-153311 A | 7/2009 |

* cited by examiner

*Primary Examiner* — Rita Leykin
(74) *Attorney, Agent, or Firm* — Rabin & Berdo, P.C.

(57) ABSTRACT

An alternating current rotating machine control device that shares information among power conversion devices and instruments. A power conversion system has a top level control device, a master station, multiple power conversion devices, instruments (such as a temperature sensor and a pressure sensor), and the like. The top level control device is connected to two of the power conversion devices by a first communication line. These power conversion devices have two or more communication functions, and are connected to a remaining power conversion device, a temperature sensor, and a pressure sensor by a second communication line.

4 Claims, 7 Drawing Sheets

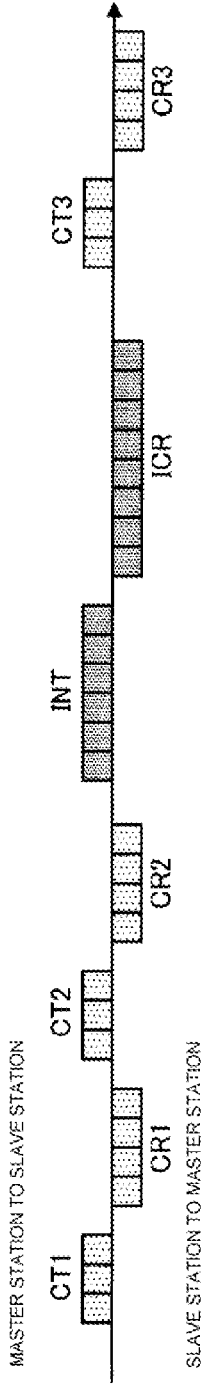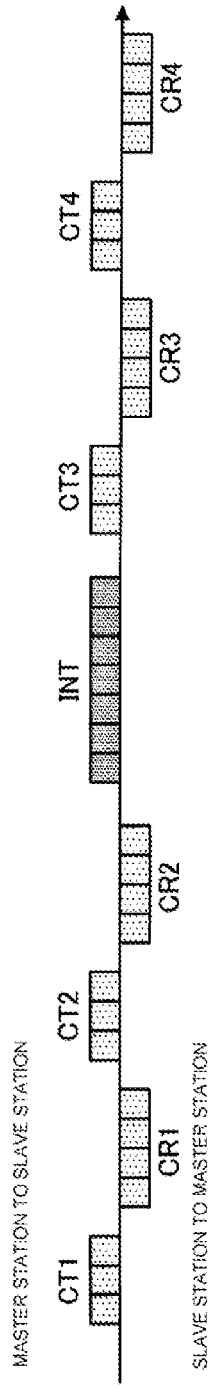

FIG. 4A

COMMUNICATION PROTOCOL FOR TRANSMISSION OF
INFORMATION FROM MASTER STATION TO SLAVE STATION

| | |
|---|---|
| 00h | STATION NUMBER |
| 01h | FC |
| 02h | OPERATION COMMAND · DI · RESET INPUT (L) |
| 03h | OPERATION COMMAND · DI · RESET INPUT (H) |
| 04h | FREQUENCY (MOTOR SPEED) SETTING (L) |
| 05h | FREQUENCY (MOTOR SPEED) SETTING (H) |
| 06h | POLLING FUNCTION ADDRESS (CORRESPONDING TO PARAMETER CODE) |
| 07h | SELECTING FUNCTION ADDRESS (CORRESPONDING TO PARAMETER CODE) |
| 08h | SELECTING FUNCTION DATA (L) |
| 09h | SELECTING FUNCTION DATA (H) |

FIG. 4B

COMMUNICATION PROTOCOL FOR TRANSMISSION OF
INFORMATION FROM SLAVE STATION TO MASTER STATION

| | |
|---|---|
| 00H | STATION NUMBER |
| 01H | FC |
| 02H | MOTOR 2 OPERATING STATUS MONITOR (L) |
| 03H | MOTOR 2 OPERATING STATUS MONITOR (H) |
| 04H | MOTOR 3 OPERATING STATUS MONITOR (L) |
| 05H | MOTOR 3 OPERATING STATUS MONITOR (H) |
| 06H | OUTPUT FREQUENCY (MOTOR SPEED) MONITOR (L) |
| 07H | OUTPUT FREQUENCY (MOTOR SPEED) MONITOR (H) |
| 08H | Chg_SIGNAL, ERROR CODE |
| 09H | POLLING FUNCTION ADDRESS (CORRESPONDING TO PARAMETER CODE) |
| 0AH | POLLING FUNCTION DATA (L) |
| 0BH | POLLING FUNCTION DATA (H) |

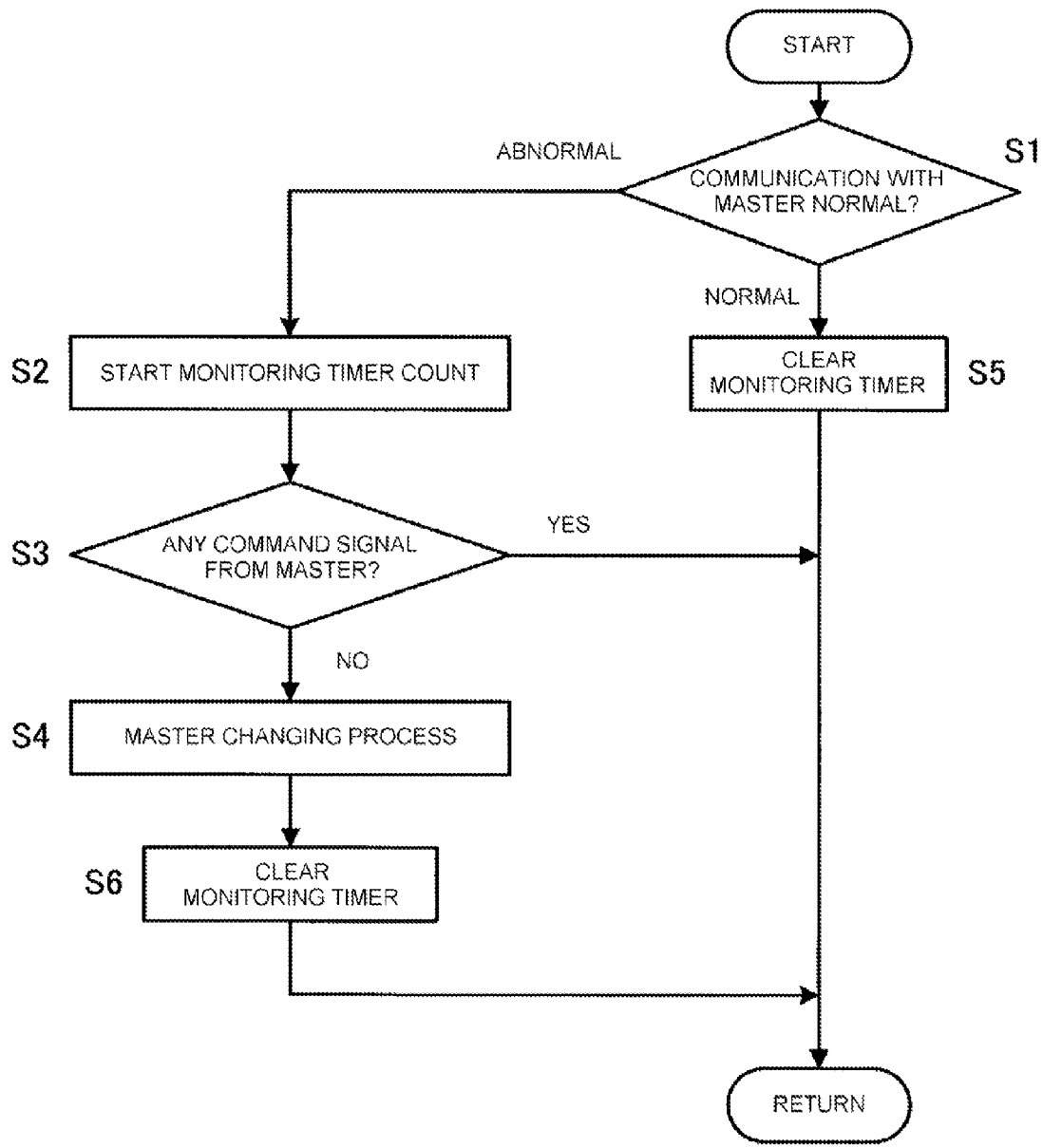

ALTERNATING CURRENT ROTATING MACHINE CONTROL DEVICE

This application is the U.S. national stage of international application Ser. No. PCT/JP2012/051763, filed in Japan on Jan. 27, 2012, which claims priority from Japanese patent application Ser. No. 2011-031185, filed on Feb. 16, 2011, and herein incorporated by reference in its entirety.

TECHNICAL FIELD

The present invention relates to an alternating current rotating machine control device, and in particular, relates to an alternating current rotating machine control device wherein power conversion devices that drive a plurality of alternating current rotating machines at a predetermined speed are provided with a function of communicating with accompanying information instruments.

BACKGROUND ART

A power conversion system that operates a plurality of alternating current rotating machines with a plurality of inverter devices (power conversion devices) can generally be structured as a system including a master device, which forms a top level control device of the system, for commanding an alternating current rotating machine rotation speed, or the like, as a target value, or for carrying out monitoring or the like. This kind of power conversion system for driving alternating current rotating machines is such that, by the system being structured as an information link system wherein the inverter devices of the plurality of alternating current rotating machines are connected by a communication line utilizing optical communication, or the like, appropriate control is possible before an alternating current rotating machine fails, based on the temperature of the alternating current rotating machine and current information detected by the inverter devices.

FIG. 6 is a system configuration diagram showing one example of a heretofore known power conversion system.

The power conversion system realizes a synchronous operation, a ratio operation, and a start/stop control of a plurality of alternating current rotating machines M1 to M3 using a top level control device 10. Herein, a PLC (Programmable Logic Controller) or a personal computer is used as a master station. Also, a plurality of power conversion devices 11 to 13, having the same function, for driving the alternating current rotating machines M1 to M3 respectively are connected as slave devices to the top level control device 10 using one communication line 21.

Herein, for example, optical fiber or the like is used for the communication line 21, and each of the power conversion devices 11 to 13 is connected to the top level control device 10 via a bidirectional module. Also, accompanying instruments such as a temperature sensor 14 and a pressure sensor 15 are also connected as slave stations, and it is thus possible to provide necessary information to the top level control device 10 via the communication line 21.

The heretofore known power conversion system is such that the top level control device 10 centrally controls information from each of the power conversion devices 11 to 13, and accompanying instruments such as the temperature sensor 14, via the communication line 21, and issues various kinds of command, such as a start/stop command or speed command, to the plurality of power conversion devices 11 to 13, which are slave devices, while determining the status of each one. Consequently, in the event that there occurs a disconnection of the communication line 21 connecting the power conversion devices 11 to 13, it is necessary for the top level control device 10 to carry out a protective operation stopping the output of the top level control device 10, or the like. Because of this, in the event that communication from the master station becomes impossible for a reason such as a disconnection of the communication line 21 connecting the master station and slave stations or a failure of a communication control instrument, automatic recovery is not possible, and the system lacks stability.

Also, there is also a case wherein an operation command or speed command to the power conversion devices 11 to 13 does not pass through the communication line, but is transmitted by an operation command using a digital on/off signal from the exterior, or a speed command, or the like, based on an analog voltage (current) input command from the exterior. In this kind of case too, it is necessary to share information for predictive maintenance, and the like, based on temperature and inverter current information before a machine fails.

As another power conversion system, there is proposed a system wherein, in an inverter configured of a power unit formed of a power source unit and a power conversion unit, a control unit formed of an application unit that can be customized by linking with parameters a combination of a plurality of execution code function blocks installed in advance, an execution code unit formed of a motor control unit, and a CPU (Central Processing Unit) that executes an execution code, and an interface unit for communication with the exterior, the inputs and outputs of a plurality of inverter devices having the same function are connected by communication, and each inverter device is assigned as a master station or slave station (refer to Patent Document 1).

Herein, one of the plurality of inverter devices having the same function becomes the master station, and a transmission and reception of write data or read data is carried out with the remaining inverter devices. Consequently, a small-scale system can be realized without using a high-cost PLC or communication control option card.

RELATED ART DOCUMENTS

Patent Documents

Patent Document 1: JP-A-2008-178236

OUTLINE OF THE INVENTION

Problems to be Solved by the Invention

However, with the system described in Patent Document 1, it is not possible to connect accompanying instruments, such as a temperature sensor, other than the plurality of inverter devices to the same communication line. Because of this, it is not possible to utilize a plurality of items of information obtained from various kinds of accompanying instrument in a control, or the like, of an alternating current rotating machine operated by an inverter device, which is a slave device, via a communication line.

Also, it is not possible either to transmit information from inverter devices that each have a different function (for example, speed detection, a clock, or the like) to other inverter devices on the same communication line via the master station. Because of this, there is a problem in that it is not possible for information from another inverter device to be commonly utilized in a control, or the like, of alternating current rotating machines.

Furthermore, in the event that the inverter device configuring the master station becomes unable to communicate for a reason such as a disconnection of the communication line or a failure of a control instrument, there is also a problem in that automatic recovery is not possible, and linkage among the plurality of inverter devices is not easy.

The invention, having been contrived bearing in mind these kinds of point, has an object of providing an alternating current rotating machine control device wherein, by sharing information among a plurality of power conversion devices and other accompanying instruments, and thus strengthening an alternating current rotating machine drive linkage, the optimization of a whole power conversion system is facilitated.

Also, another object of the invention is to provide an alternating current rotating machine control device with which it is possible to configure a power conversion system wherein automatic recovery is possible even in the event that communication becomes impossible for a reason such as a disconnection of a communication line or a failure.

Means for Solving the Problems

In order to solve the heretofore described problems, the invention provides an alternating current rotating machine control device provided with a function of communicating between a plurality of power conversion devices that drive alternating current rotating machines at a predetermined speed and accompanying information instruments. The alternating current rotating machine control device is configured of a top level control device at a level above the power conversion devices that issues various kinds of command to, or carries out a monitoring of, the power conversion devices or the information instruments, a first communication means that connects the top level control device and a specific power conversion device, and transmits and receives a signal between the top level control device and power conversion device, and a second communication means that connects the plurality of power conversion devices to each other, and connects the plurality of power conversion devices and the information instruments to each other, thereby maintaining the mutual linking thereof.

The alternating current rotating machine is such that the specific power conversion device connected to the top level control device is adopted as a master station, whereby control status information held by all the power conversion devices and information instruments can be shared.

Advantage of the Invention

According to the invention, when the plurality of power conversion devices are controlled to operate in concert, information of the plurality of alternating current rotating machine driving power conversion devices and other instruments is shared via a communication function, it is possible to strengthen the linkage, and thus possible to promote optimization of the whole system.

The heretofore described and other objects, characteristics, and advantages of the invention will be clarified by the attached drawings representing embodiments preferred as examples of the invention, and by the following related description.

BRIEF DESCRIPTION OF THE DRAWINGS

FIGS. 2(A) and 2(B) are time charts showing timings of transmissions of information between a master station and slave stations.

FIGS. 4(A) and 4(B) are diagrams showing communication protocol for a transmission of information between the master station and slave stations.

FIG. 5 is a flowchart showing one example of a judging procedure for changing the master device.

MODES FOR CARRYING OUT THE INVENTION

Figure 1:
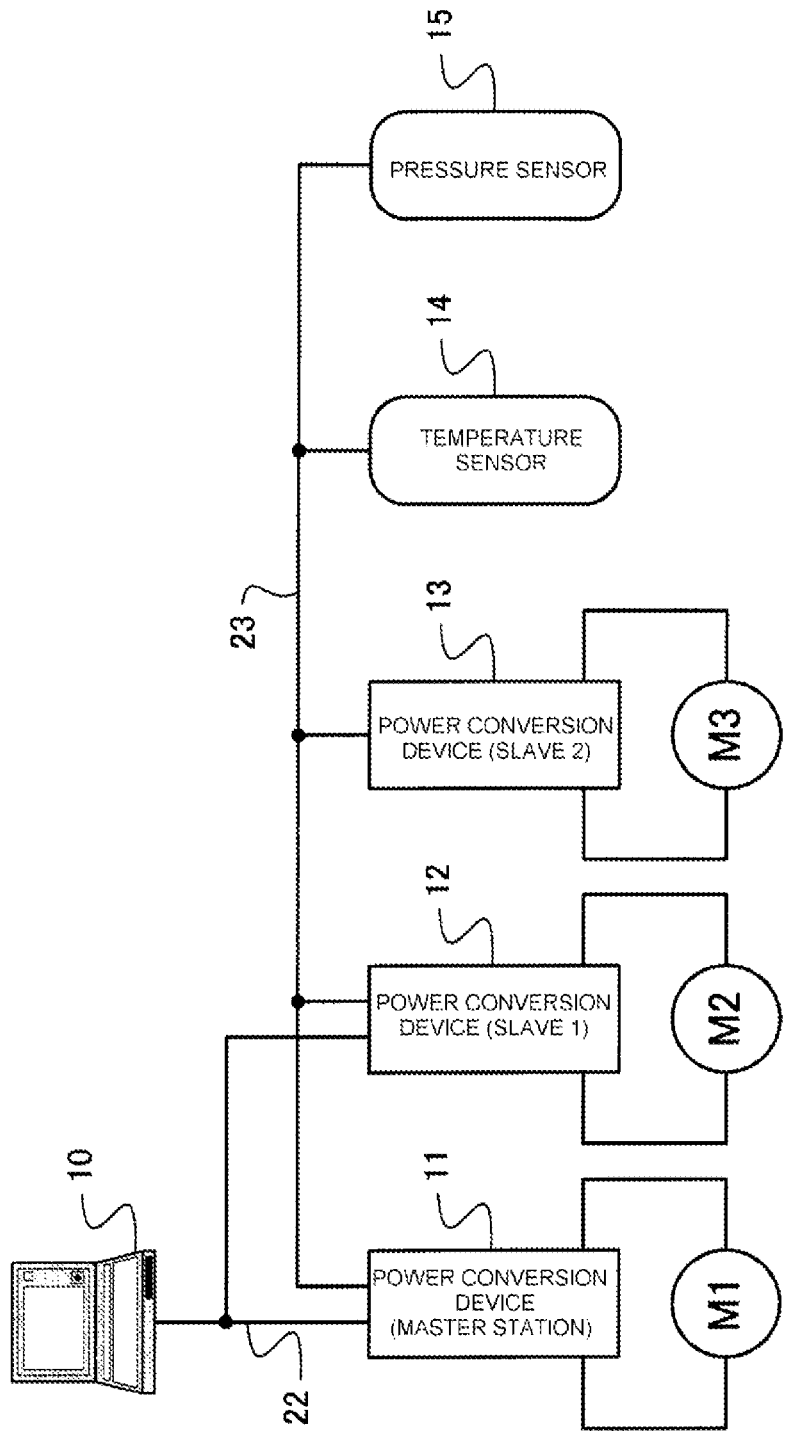
FIG. 1 is a block diagram showing a power conversion system according to Embodiment 1 of the invention.

Hereafter, referring to the drawings, a description will be given of embodiments of the invention.

(Embodiment 1)

FIG. 1 is a block diagram showing a power conversion system according to Embodiment 1 of the invention.

The power conversion system is configured of a top level control device 10, a plurality of power conversion devices 11 to 13, accompanying information instruments, and the like. The top level control device 10 issues various kinds of command, such as a start/stop command or speed command, to the power conversion devices 11 to 13, or carries out a monitoring, or the like, of the status of the power conversion devices 11 to 13 or alternating current rotating machines M1 to M3. The power conversion devices 11 to 13 control the speed of the alternating current rotating machines M1 to M3 respectively. Herein, the accompanying information instruments are assumed to be various kinds of sensor instrument, such as a temperature sensor 14 and a pressure sensor 15, provided in a load such as a pump driven by the alternating current rotating machines M1 to M3 and the like. Also, the power conversion devices 11 to 13 each having a different function, for example, the power conversion device 12 is equipped with a function detecting speed or position, or the like, while the power conversion device 13 is equipped with a clock function, or the like.

Also, the top level control device 10 is connected by a first communication line 22 to the power conversion device 11, which is set as a master station, and the power conversion device 12, which is set as a candidate for master station, and transmission and reception of signals is carried out between the top level control device 10 and the specified power conversion devices 11 and 12. Furthermore, the power conversion devices 11 and 12, being equipped with two or more communication functions, are connected to the remaining power conversion device 13 and various types of sensor instrument, such as the temperature sensor 14 and pressure sensor 15, by a second communication line 23 that does not pass through the top level control device 10, and transmission and reception of signals is carried out among the power conversion devices 11 to 13, and between the power conversion devices 11 and 12 and sensor instruments such as the temperature sensor 14 and pressure sensor 15.

That is, only the two power conversion devices 11 and 12 connected to the top level control device 10 by the first communication line 22 can be master stations. Also, the power conversion devices 12 and 13, which configure slave stations 1 and 2, are connected to each other and to the temperature sensor 14 and pressure sensor 15 by the second communication line 23, which is separate from the first communication line 22 and does not pass through the top level control device 10, and the mutual linking thereof is maintained. Because of this, control of distribution to the plurality of alternating current rotating machines M1 to M3 is possible, and an efficient transmission of information to and from the accompanying information instruments, that is, the temperature sensor 14 and pressure sensor 15, is possible without passing through the top level control device 10. Furthermore, it is also possible for information on a detected speed value, a clock, or the like, from the power conversion devices 12 and 13, which have different functions (a speed detection function, a clock function, and the like), to be shared by all the power conversion devices 11 to 13.

In Embodiment 1, the power conversion system may also be one that does not include information instruments such as the temperature sensor 14 and pressure sensor 15. For example, a configuration may be such that only the power conversion devices 11 to 13, which have different functions, are connected by the second communication line 23, and the various items of information on a detected speed value, a clock, or the like, individually held by each of the power conversion devices 11 to 13, are shared by all the power conversion devices 11 to 13.

Herein, the power conversion devices 11 and 12 include a communication module necessary for connection with the first and second communication lines 22 and 23 respectively. Also, the power conversion devices 12 and 13 include a communication module necessary for connection with the second communication line 23. The first and second communication lines 22 and 23 are both configured of optical cables, or the like, and transmit and receive, as well as a failure signal, other signals, including a control signal.

Figure 6:
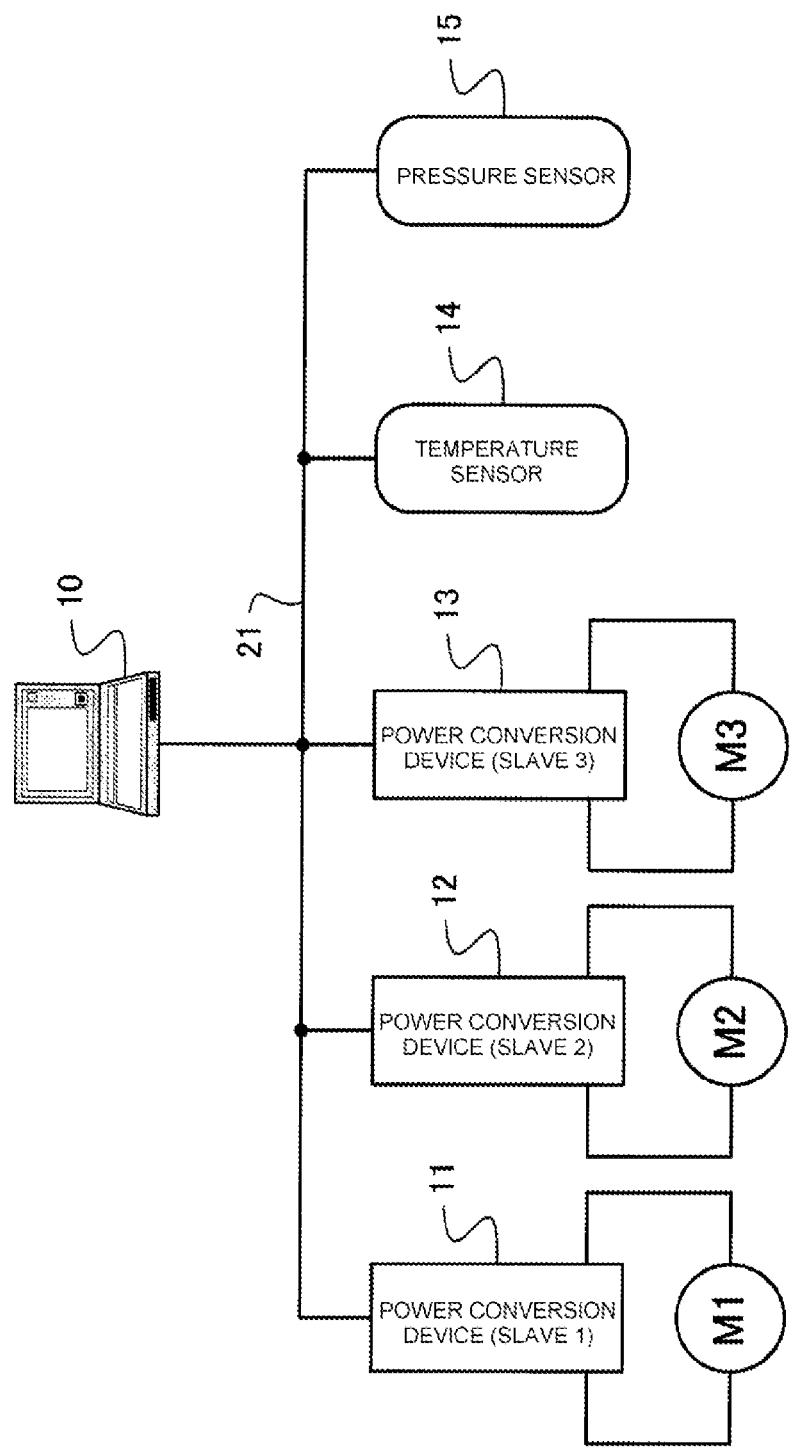
FIG. 6 is a system configuration diagram showing one example of a heretofore known power conversion system.

The configuration of a heretofore known power conversion system shown in FIG. 6 differs from the heretofore described Embodiment 1 in that the power conversion devices 11 to 13 and top level control device 10 are connected by only one line 21, which has a single communication function, and that the plurality of power conversion devices 11 to 13 all have the same function.

With the system configuration of the heretofore described Embodiment 1, it is possible to achieve sharing of a digital interface (DI/DO) of the power conversion devices 11 to 13, which drive the alternating current rotating machines M1 to M3, for inputting a digital signal from the exterior or outputting a digital signal to the exterior, or an analog interface (AI/AO) for inputting an analog signal from the exterior or outputting an analog signal to the exterior, control status information including a clock function, speed, position and the like, and the like, and thus possible to restrict a high-cost power conversion device, of higher functionality than a heretofore known device, to the minimum necessary. Also, by restricting a communication option card or the like to the minimum necessary, it is possible to optimize the whole system, and a linkage operation such as a ratio operation, which can be applied to distribution with the top level control device 10, becomes easier in the power conversion devices 11 to 13.

Furthermore, in the event that the power conversion device 11 set as the master station becomes unable to communicate for a reason such as a disconnection of the first communication line 22 or a failure of the communication module, it is possible to change the power conversion device 12, designated in advance as a candidate for the next master station, to being a new master station. Consequently, automatic recovery is possible without impairing the linkage operation of the whole system.

FIGS. 2(A) and 2(B) are time charts showing timings of transmissions of information between a master station and slave stations. FIG. 2(A) shows a timing (1) of transmissions of information between the master station and slave stations. At a normal time, control signals CT1, CT2, and CT3 are supplied as cyclical commands from the master station to the slave stations, and necessary data are transmitted as response signals CR1, CR2, and CR3 to the master station from the slave stations in response to the signals CT1, CT2, and CT3. Data needing to be constantly retrieved from the master station, such as, for example, speed data and power consumption data, are included in the response signals CR1, CR2, and CR3. Herein, a communication line 24 is assumed as a half-duplex communication system, but the slave stations and master station may also be connected by a full-duplex communication line.

Among the power conversion device 11, which is the master station, and the power conversion devices 12 and 13 and accompanying information instruments (temperature sensor 14 and pressure sensor 15), which are the slave stations, in addition to predetermined cyclical commands, a command responding to an interrupt processing such as a failure detection signal, or the like, is sent as a one-shot command from the power conversion device 11, which is the master station, to the power conversion devices 12 and 13, temperature sensor 14, and pressure sensor 15, which are the slave stations, and processed there as an interrupt signal INT. At this time, a response signal ICR is returned from the slave stations to the master station in response to an operation command, a speed command, and write/read commands for each function.

Also, FIG. 2(B) shows a timing (2) of transmissions of information between the master station and slave stations. At a normal time, control signals CT1 to CT4 are supplied as cyclical commands from the master station to the slave stations, and necessary data are transmitted as response signals CR1 to CR4 to the master station from the slave stations in response to the signals CT1 to CT4. Data needing to be constantly retrieved from the master station, such as, for example, speed data and power consumption data, are included in the response signals CR1 to CR4. Herein, the communication line 23 shown in FIG. 1 is assumed as a half-duplex communication system, but the slave stations and master station may also be connected by a full-duplex communication line.

Between the power conversion device 11 and power conversion device 12, in addition to predetermined cyclical commands, an abnormal command responding to a failure detection signal or the like, or the like, is sent as a one-shot command from the power conversion device 11, which is the master station, and the abnormal command is processed in the power conversion device 12, which is a slave station, as the interrupt signal INT.

Among the power conversion device 11, which is the master station, and the power conversion devices 12 and 13 and accompanying information instruments (temperature sensor 14 and pressure sensor 15), which are the slave stations, in addition to predetermined cyclical commands, a command responding to an interrupt processing such as a failure detection signal, or the like, is sent as a broadcast signal from the power conversion device 11, which is the master station, to the power conversion devices 12 and 13 and accompanying information instruments (the temperature sensor 14 and pressure sensor 15), which are the slave stations, simultaneously, and processed there as the interrupt signal INT, and the same data of an operation command, a speed command, and the like, from the master station are written into the slave stations.

In FIG. 2(B), the same data of the interrupt signal INT are transmitted simultaneously from the master station using a broadcast method, and written into all the slave stations, while in FIG. 2(A), a write/read of data is carried out from the master station individually for each slave station based on the interrupt signal INT.

(Embodiment 2)

Figure 3:
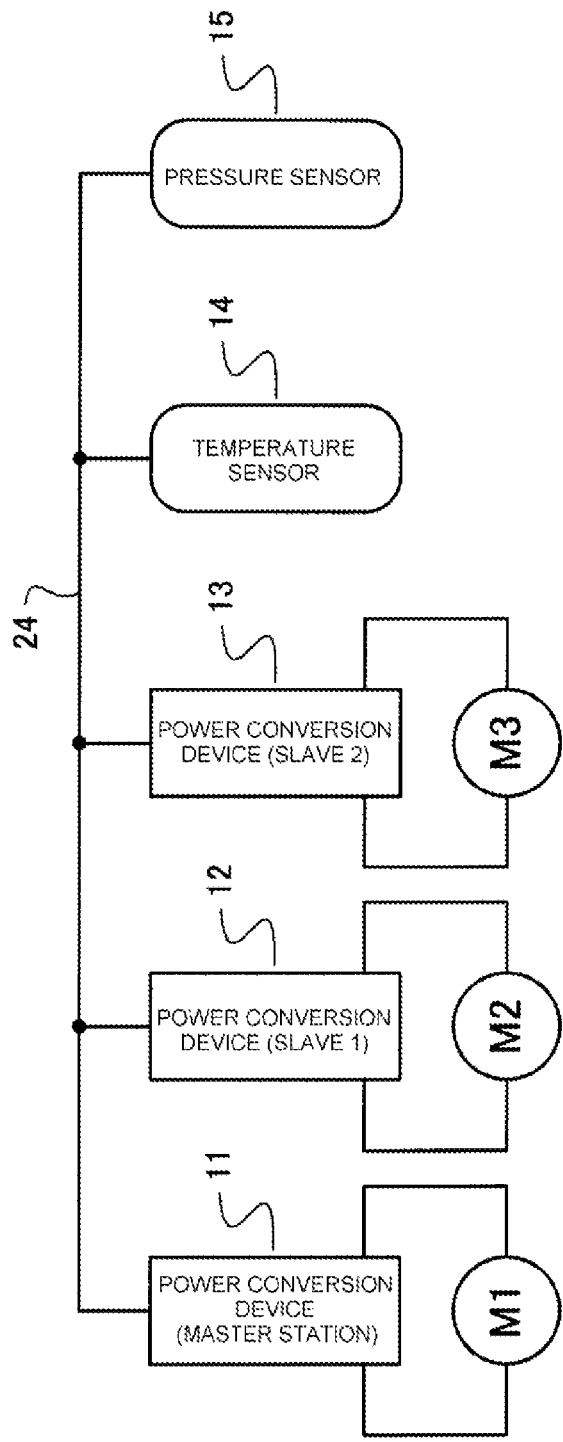
FIG. 3 is a block diagram showing a power conversion system according to Embodiment 2 of the invention.

FIG. 3 is a block diagram showing a power conversion system according to Embodiment 2 of the invention.

The power conversion system is configured of the plurality of power conversion devices 11 to 13 that control the speed of the alternating current rotating machines M1 to M3 respectively, accompanying information instruments, and the like. The power conversion devices 11 to 13 each having a different function, for example, the power conversion device 12 is equipped with a function detecting speed or position, or the like, while the power conversion device 13 is equipped with a clock function, or the like. Herein, the accompanying information instruments are assumed to be various kinds of sensor instrument, such as the temperature sensor 14 and pressure sensor 15, provided in a load such as a pump driven by the alternating current rotating machines M1 to M3 and the like. Also, the communication line 24 connects the three power conversion devices 11 to 13 to each other, and connects the power conversion devices 11 to 13 and the temperature sensor 14 and pressure sensor 15 accompanying the alternating current rotating machines M1 to M3 to each other, and the mutual linking thereof is maintained.

The power conversion devices 11 to 13, temperature sensor 14, and pressure sensor 15 include a communication module necessary for connection with the communication line 24. Herein, of the power conversion devices 11 to 13, for example, the power conversion device 11 is designated as a master station, while the remaining power conversion devices 12 and 13, temperature sensor 14, and pressure sensor 15 are taken to be slave stations. Also, the power conversion device (for example, the power conversion device 12) that is to be the next candidate for master station is set in advance from the power conversion devices 12 and 13 set as slave stations. Because of this, it is possible for necessary operation control information to be shared by all the power conversion devices, the temperature sensor 14, and the pressure sensor 15. Furthermore, it is also possible for information on a detected speed value, a clock, or the like, from the power conversion devices 12 and 13, which have different functions (a speed detection function, a clock function, and the like), to be shared by all the power conversion devices 11 to 13.

In Embodiment 2, as the system may also be one that does not include information instruments such as the temperature sensor 14 and pressure sensor 15, a configuration may be such that only the power conversion devices 11 to 13, which have different functions, are connected by the communication line 24, and the various items of information on a detected speed value, a clock, or the like, individually held by each of the power conversion devices 11 to 13, are shared by all the power conversion devices 11 to 13. Herein, the communication line 24 is configured of an optical cable, or the like, and transmits and receives, as well as a failure signal, other signals, including a control signal.

With the system configuration of the heretofore described Embodiment 2, it is possible to achieve sharing of a digital interface (DI/DO) and analog interface (AI/AO) of the power conversion devices 11 to 13, which drive the alternating current rotating machines M1 to M3, control status information including a clock function, speed, position and the like, and the like, and thus possible to restrict a high-cost power conversion device, of higher functionality than a heretofore known device, to the minimum necessary. Also, by restricting a communication option card or the like to the minimum necessary, it is possible to optimize the whole system, and a linkage operation such as a ratio operation, which can be applied to distribution, becomes easier among the power conversion devices 11 to 13.

Also, in the event that the power conversion device 11 set as the master station becomes unable to communicate with the slave stations for a reason such as a disconnection of the communication line 24 or a failure of the communication module, it is possible to change the power conversion device 12, designated in advance as the candidate for the next master station, to being a new master station. Consequently, automatic recovery is possible without impairing the linkage operation of the whole system.

Furthermore, in the event too that the power conversion device for driving a master alternating current rotating machine becomes unable to communicate for a reason such as a disconnection of the communication line or a failure, automatic recovery is possible.

As the timings of transmissions of information between the master station and slave stations are the same as in the previously described FIGS. 2(A) and (B), a description will be omitted here.

FIGS. 4(A) and 4(B) are diagrams showing communication protocol for a transmission of information between the master station and slave stations. FIG. 4(A) is communication protocol for a transmission of information from the master station to the slave stations, while FIG. 4(B) is communication protocol for a transmission of information from the slave stations to the master station.

Herein, a station number stored in an address 00h (and 00H) is a number for identifying one slave station from a plurality of slave stations (that is, the power conversion devices 11 to 13, temperature sensor 14, and pressure sensor 15).

FC stored in an address 01h (and 01H) signifies a function code for identifying each kind of function on the same one of the communication lines 22 to 24. Because of this, even when slave stations that do not have the same function are connected on the same one of the communication lines 22 to 24, it is possible to identify the application of a function among only devices having the same function.

Operation commands of addresses 02h and 03h and frequency settings of addresses 04h and 05h signify operation commands and frequency commands from the master station to the slave stations.

An address at which polling function data are stored, that is, a polling function address, is disposed in an address 06h. Herein, a polling function is any kind of function that can be read by the master station from a slave station.

An address at which selecting function data are stored, that is, a selecting function address (08h, 09h), is disposed in an address 07h. Herein, a selecting function is any kind of function that can be written by the master station into a slave station. Consequently, selecting function data are stored in each of addresses 08h and 09h.

In the protocol of FIG. 4(B), an operating status monitor of the alternating current rotating machine M2 is stored in addresses 02H and 03H. Also, an operating status monitor of the alternating current rotating machine M3 is stored in addresses 04H and 05H. Furthermore, an output frequency monitor is stored in addresses 06H and 07H. These operating status monitors, output frequency monitors, and the like, signify monitor data from a slave station to the master station.

A change (Chg) signal and error code are stored in an address 08H. These signals are signals that function as a change command from a slave station to the master station.

Addresses at which polling function data are stored, that is, polling function addresses (0AH, 0BH), are disposed correlated to the address 06h in an address 09H. Consequently, actual polling function data are stored in each of the addresses 0AH and 0BH.

FIG. 5 is a flowchart showing one example of a judging procedure for changing the master station.

Shown herein is a judging procedure executed in the slave station (the power conversion device 12) on standby as the next master station in Embodiments 1 and 2 shown in FIG. 1 and FIG. 3 respectively.

In step S1, it is determined whether or not the status of communication with the master station is normal. That is, as long as a cyclical command is coming from the master station (the power conversion device 11) to the power conversion device 12, it is determined that the status of communication with the master station is normal, and the process shifts to step S5. Meanwhile, in the event that the power conversion device 11, which is the first master station, becomes unable to communicate for a reason such as a disconnection of the communication line or a failure of the communication module, the cyclical command no longer comes from the master station (the power conversion device 11) to the power conversion device 12, and the process shifts to the next step S2.

In step S2, a count is started in a monitoring timer of the slave station, and the process shifts to the next step S3. In step S3, it is determined whether or not there is a command signal from the master station within a certain time. In the event that there is no command signal from the power conversion device 11, which is the master station, within the certain time measured by the monitoring timer, it is determined that there is an abnormality, and the process shifts to step S4. Then, a master station changing process is executed, and the slave station (the power conversion device 12) on standby as the next master station is set as a new master station.

If it is determined in step S1 that the status of communication with the master station is normal, or if the master station changing process is executed in step S4, the process shifts to step S5 or S6 respectively, the monitoring timer of the slave station is cleared, and the process returns to step S1.

In the event that a command signal is sent from the master station within the certain time measured by the monitoring timer in step S3, the process is started directly from a processing (step S1) for a new judging procedure.

Thus, with the alternating current rotating machine control device of the invention, it is possible to automatically change the slave station (the power conversion device 12) on standby to being the master station. As the control, the status of the first master station (the power conversion device 11) is constantly monitored in the next master station (the power conversion device 12), and in the event that there is no command signal from the master station (the power conversion device 11) for a certain time, the next master station (the power conversion device 12) is caused to function as the master station. Subsequently, in the event that relief from the condition in which the first master station (the power conversion device 11) is unable to communicate is realized, the power conversion device 11 becomes a slave station, the communication status of the master station (the power conversion device 12) is monitored for a certain time, it is determined that the new master station (the power conversion device 12) does not exist in the event that there is no communication, and the first master station (the power conversion device 11) returns to being the master station again.

The above simply shows the principle of the invention. Furthermore, a large number of modifications and changes being possible to those skilled in the art, and the invention not being limited to the exact configurations and applications shown and described above, all corresponding modification examples and equivalents are seen as being within the range of the invention according to the attached claims and equivalents.

The invention claimed is:

1. An alternating current rotating machine control device that communicates between a plurality of power conversion devices and information instruments, the power conversion devices driving alternating current rotating machines at a predetermined speed, the alternating current rotating machine control device comprising:
   a top level control device that issues commands to the power conversion devices and monitors the power conversion devices and the information instruments;
   a first communication line that connects the top level control device and a master station among the power conversion devices, and transmits and receives a signal between the top level control device and the master station; and
   a second communication line that connects the plurality of power conversion devices to each other, and connects the plurality of power conversion devices to the information instruments,
   wherein the to level control device designates in advance a plurality of the power conversion devices as candidates for the master station, and in the event that communication via the first communication line between the master station and the top level control device becomes impossible, one of the remaining power conversion devices becomes the master station.

2. An alternating current rotating machine control device that communicates among a plurality of power conversion devices, each having a different function, that drive alternating current rotating machines at a predetermined speed, the alternating current rotating machine control device comprising:
   a top level control device that issues commands to, and monitors, the power conversion devices;
   a first communication line that connects the top level control device and a master station among the power conversion devices, and transmits and receives a signal between the top level control device and the master station; and
   a second communication line that connects the plurality of power conversion devices to each other,
   wherein the top level control device designates in advance a plurality of the power conversion devices as candidates for the master station, and in the event that communication via the first communication line between the master station and the top level control device becomes impossible, one of the remaining power conversion devices becomes the master station.

3. An alternating current rotating machine control device that communicates between a plurality of power conversion devices and information instruments, the power conversion devices driving alternating current rotating machines at a predetermined speed, the alternating current rotating machine control device comprising:
   a communication line that connects the plurality of power conversion devices to each other, and connects the plurality of power conversion devices to the information instruments, wherein
     one of the power conversion devices is a master station, and
     a plurality of the power conversion devices are designated in advance as candidates for the master station, and in the event that the power conversion device designated as the master station becomes unable to communicate with the remaining power conversion devices via the communication line, one of the remaining power conversion devices becomes the master station.

4. An alternating current rotating machine control device that communicates among a plurality of power conversion devices, each having a different function, that drive alternating current rotating machines at a predetermined speed, the alternating current rotating machine control device comprising:

a communication line that connects the plurality of power conversion devices to each other, wherein
one of the power conversion devices is a master station, and
a plurality of the power conversion devices are designated in advance as candidates for the master station, and in the event that the power conversion device designated as the master station becomes unable to communicate with the remaining power conversion devices via the communication line, one of the remaining power conversion devices becomes the master station.

* * * * *